April 30, 1968  W. J. YARD  3,380,397
CONVERTIBLE RAIL-HIGHWAY LOCOMOTIVE
Filed Dec. 23, 1965  2 Sheets-Sheet 1
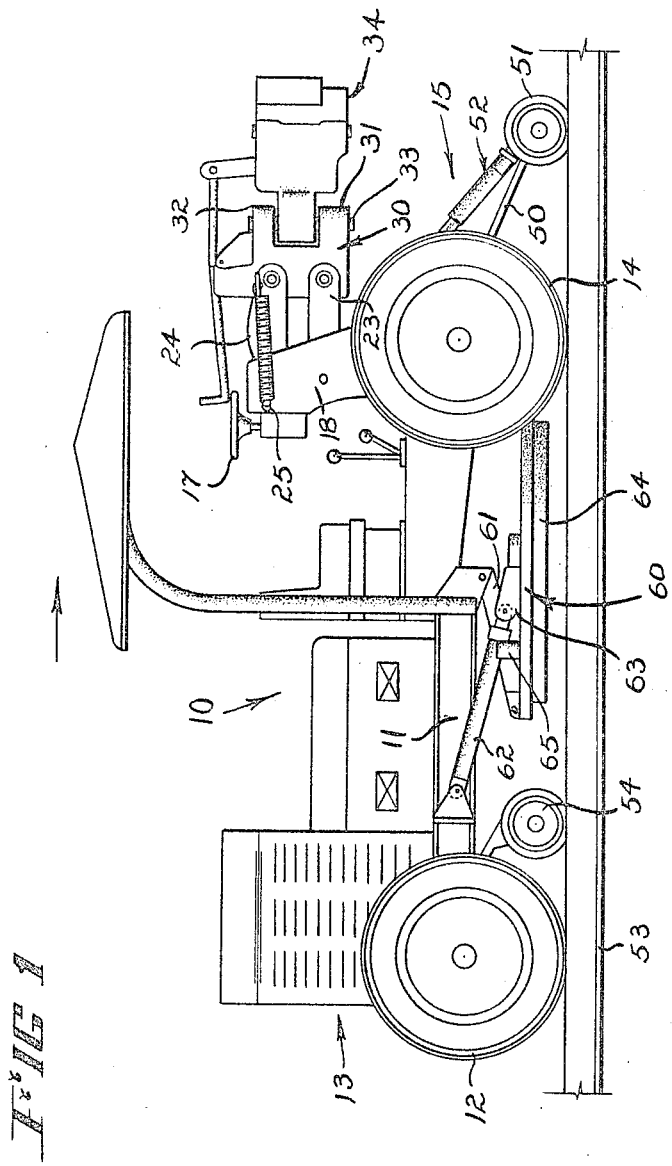

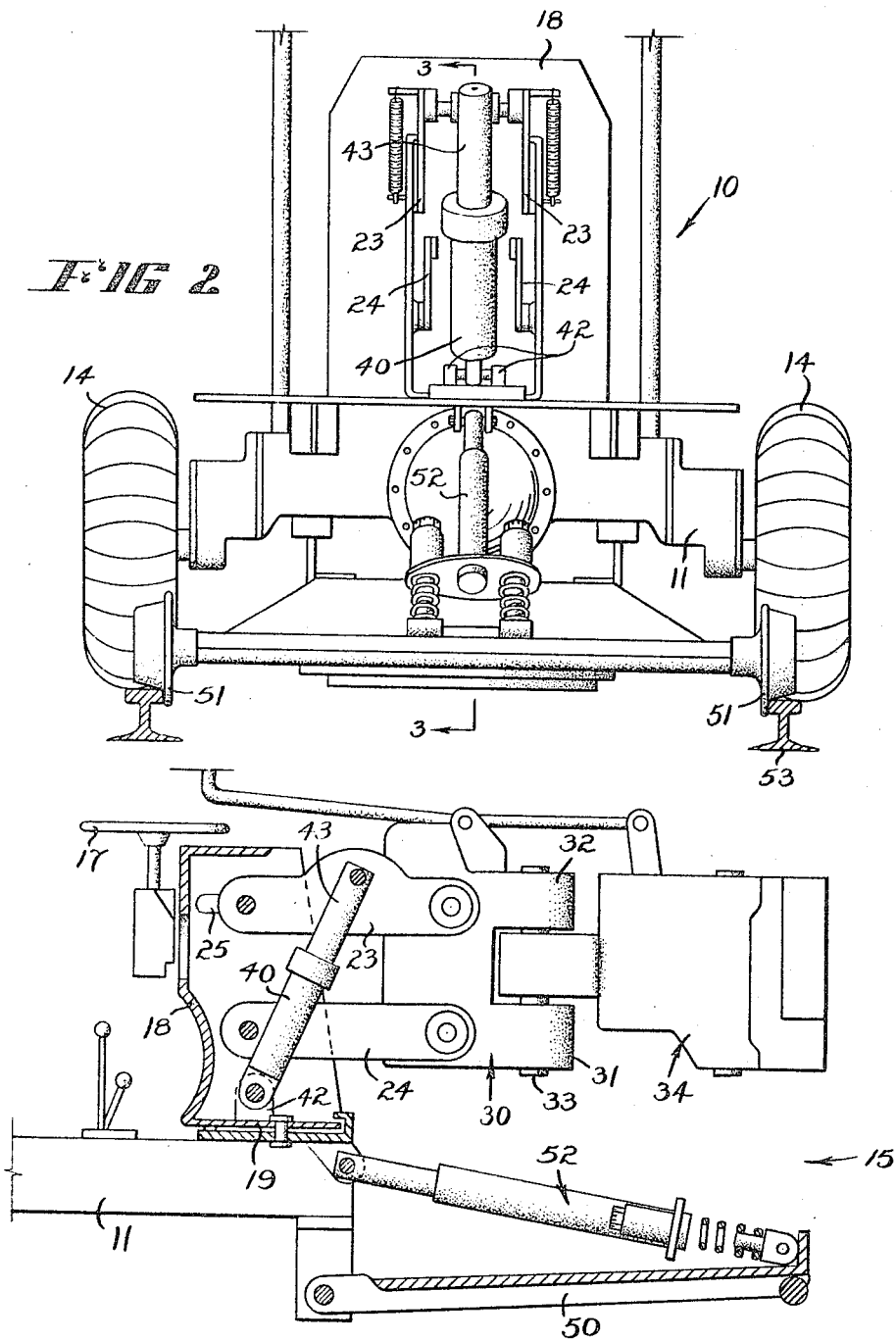

# United States Patent Office 3,380,397
Patented Apr. 30, 1968

3,380,397
CONVERTIBLE RAIL-HIGHWAY LOCOMOTIVE
William J. Yard, Cavan, South Australia, Australia, assignor to Australian Railway Equipment Supply Company, Proprietary Limited and Trak-Chief Manufacturing Proprietary Ltd., both of Cavan, South Australia, Australia
Filed Dec. 23, 1965, Ser. No. 515,825
3 Claims. (Cl. 105—26)

ABSTRACT OF THE DISCLOSURE

A shunting vehicle useable for railway or highway purposes and having a coupling block suitable for coupling the vehicle to a railway truck, the coupling block being pivotal with respect to the shunting vehicle chassis and being raised or lowered by a ram acting through a parallel arm arrangement.

---

This invention relates to a shunting vehicle which is suitable for the shunting of railway trucks.

Railway trucks have previously been shunted by large haulage units for the reason that there is insufficient traction between the wheels of a small haulage unit and the rails. This has involved considerable cost, and frequently the haulage units used in shunting have been of sufficient size for general hauling purposes.

The main object of this invention is to provide a small comparatively low cost shunting vehicle which will nevertheless have good rail traction, so that the need for using heavy and expensive large hauling units for shunting purposes can be removed.

In its simplest form this invention may be said to consist of a shunting vehicle which comprises a chassis, traction wheels at least partly supporting the chassis, the track width of the wheels enabling them to run along the rails of a railway track, a coupling block at one end of the vehicle adjacent the traction wheels engageable with a complementary coupling on a railway vehicle, and lifting means operable to apply a lifting force to the coupling block relative to the chassis, whereby part of the weight of a railway vehicle coupled to the shunting vehicle is transferable to the traction wheels.

An embodiment of the invention is described hereunder in some detail with reference to and is illustrated in the accompanying drawings, in which:

FIG. 1 is a side elevation of a shunting vehicle,
FIG. 2 is a part front end elevation of same, but to a larger scale, and with the coupling block 30 removed, and
FIG. 3 is a fragmentary section on line 3—3 of FIG. 2.

According to this embodiment a shunting vehicle 10 consists of a chassis 11 which has two steering wheels 12 at its rear end 13 and two traction wheels 14 at its front end 15. Steering is effected by a manually operable steering wheel 17 which is on a coupling sub-chassis 18. The coupling sub-chassis 18 is itself on a small turntable 19 on the front end of the main chassis 11 and is disposed slightly rearwardly of the traction wheels. The turntable 19 allows about ten degrees of turn about a vertical axis between the coupling sub-chassis 18 and the main chassis 11.

The coupling sub-chassis has two swivel arms 23 and 24 disposed one above the other on each side, the swivel arms 23 and 24 being substantially parallel to each other. The rear end of the lower swivel arm 24 is pivotally mounted between side plates on the coupling sub-chassis 18, and the rear end of the upper swivel arm 23 is similarly pivotally mounted, but the pivotal interconnection is by means of a rod which passes through longitudinal slots 25 in the latter case. This allows a limited longitudinal movement of the upper swivel arm 23.

The forward ends of the two swivel arms 23 and 24 are pivotally connected to the side faces of a coupling block 30, the coupling block 30 terminating at its front end in a lower coupling engaging arm 31 and an upper arm 32 defining a general C shape. A pin 33 extends between the arms 31 and 32. The arrangement is such that the coupling block 30 supports a standard coupling device 34 which can be positioned over a complementary coupling of a truck on a railway line, and the pin 33 prevents any relative travel between the shunting vehicle and the railway truck, while the lower arm 31 urges some of the weight of the truck back on to the traction wheels 14 of the shunting vehicle 10.

In order to effect the lift which will place the truck weight on the traction wheels 14, a coupling ram 40 is trunnion mounted at its lower end between lugs 42 on the sub-chassis 18 and the piston rod 43 is pivotally connected to the arms 23. Thus when the coupling ram 40 operates, it lifts the coupling block 30 and the amount of upward force of the lower coupling engaging arm 31 on the coupling of a railway truck is transmitted downwardly to the traction wheels 14. The coupling block 30 is disposed as nearly above the traction wheels as is reasonably convenient (see FIG. 1), and the coupling ram 40 slopes so that its reaction is directed rearwardly (see FIG. 3).

The front end of the chassis 11 carries on it a pivoted frame 50 on the end of which are disposed front rail guide wheels 51, and a rail guide wheel ram 52 is disposed between the chassis 11 and the frame 50 so that upon operation of the ram 52 the guide wheels 51 are lowered to or raised from the rails 53. Similarly rear guide wheels 54 are engageable against the rails adjacent the rear wheels 12.

The traction wheels 14 in this embodiment consist of pneumatic tired wheels which are inflated to a high pressure (to about 100 p.s.i.). It is found that with the weight of a truck on these wheels, sufficient traction is available between the wheels and rails to shunt a number of trucks at any one time.

The central portion of the chassis 11 between the traction wheels 14 and the steering wheels 12 has depending from it a turntable frame 60 (FIG. 1) which is mounted to the chassis 11 by means of link arms 61 and a turntable ram 62. The turntable ram 62 is trunnion mounted to the main chassis 11 and its piston rod is pivotally connected to lugs 63 on the turntable frame, the arrangement being such that when the turntable ram 62 operates it drives the turntable frame 60 downwardly.

A turntable 64 is rotatably mounted on a shaft (not shown) depending from the turntable frame 60, and the shaft is arranged to be driven by a hydraulic motor 65.

The manner in which the shunting vehicle is used is as follows: The vehicle is driven across rails until it straddles the rails, whereupon the turntable is lowered on to the ground and the vehicle is lifted above the rails. The vehicle is then rotated around the turntable until the wheels become positioned above the rails. The rail guide wheels are then lowered to locate the traction wheels relative to the rails by operating the guide wheel ram. The turntable is then lifted allowing the weight of the traction vehicle to be carried by the pneumatic tires engaging the rails. The vehicle is then driven along the rails, being guided by means of the rail guide wheels. The coupling device 34 is driven into engagement with a complementary coupling on a truck, and the coupling ram is then operated to lift the coupling device 34. Continued lifting urges the lower arm 31 into firm engagement with the coupling device and the force of lift is transmitted directly on to the traction wheels. The truck is then shunted, and the shunting vehicle can be disengaged from the truck and removed from the rails by reversing the above procedure.

What I claim is:

1. A shunting vehicle including a chassis, a pair of traction wheels supporting the front end of the chassis, a pair of steering wheels supporting the rear end of the chassis, the width between the wheels of each said pair being such that said wheels are able to ride on the rails of a railway track, track engaging guide wheels adapted to be lowered from the chassis and to engage the rails of a railway track to thereby guide the vehicle along the rails, a coupling device capable of engagement with a complementary coupling device on a railway vehicle in such manner as to be capable of transmitting lifting force from said coupling device to the complementary coupling device, means connecting said coupling device to said chassis with said connecting means providing pivotal movement of said coupling device about a vertical axis and with said connecting means including a coupling ram, a coupling block and a pair of substantially parallel swivel arms operatively connecting the coupling ram to the coupling block so that lifting force applied by said ram to the coupling block will be transmitted to the coupling device and the complementary coupling device, whereby part of the weight of a railway vehicle coupled to the shunting vehicle is transferable to the traction wheels.

2. A shunting vehicle including a chassis, a pair of traction wheels supporting the front end of the chassis, a pair of steering wheels supporting the rear end of the chassis, the width between the wheels of each said pair being such that said wheels are able to ride on the rails of a railway track, track engaging guide wheels adapted to be lowered from the chassis and to engage the rails of a railway track to thereby guide the vehicle along the rails, a coupling device capable of engagement with a complementary coupling device on a railway vehicle in such manner as to be capable of transmitting lifting force from said coupling device to the complementary coupling device, means connecting said coupling device to said chassis with said connecting means including a coupling block of C shape connected to said coupling device for pivotal movement about a vertical axis and with said connecting means including a sub-chassis with means mounting said sub-chassis to said chassis for pivotal movement about a vertical axis and a coupling ram and a pair of substantially parallel swivel arms operatively connecting the coupling ram to the sub-chassis and said coupling block so that lifting force applied by said ram to the coupling block will be transmitted to the coupling device and the complementary coupling device, whereby part of the weight of a railway vehicle coupled to the shunting vehicle is transferable to the traction wheels.

3. A shunting vehicle according to claim 2, wherein said swivel arms swivel about rods on the sub-chassis, at least one of said rods being movable in a longitudinal slot thereby allowing limited longitudinal movement of a swivel arm.

References Cited

UNITED STATES PATENTS

| | | | |
|---|---|---|---|
| 2,722,897 | 11/1955 | Morey | 105—73 |
| 3,130,686 | 4/1964 | Fiechter et al. | 105—215 |
| 3,198,137 | 8/1965 | White | 105—215 |
| 3,232,241 | 2/1966 | White | 105—75 |
| 3,249,067 | 5/1966 | Keller | 105—215 |

FOREIGN PATENTS 861,863   9/1965   Australia.

ARTHUR L. LA POINT, *Primary Examiner.*

H. BELTRAN, *Assistant Examiner.*